Figure 1:
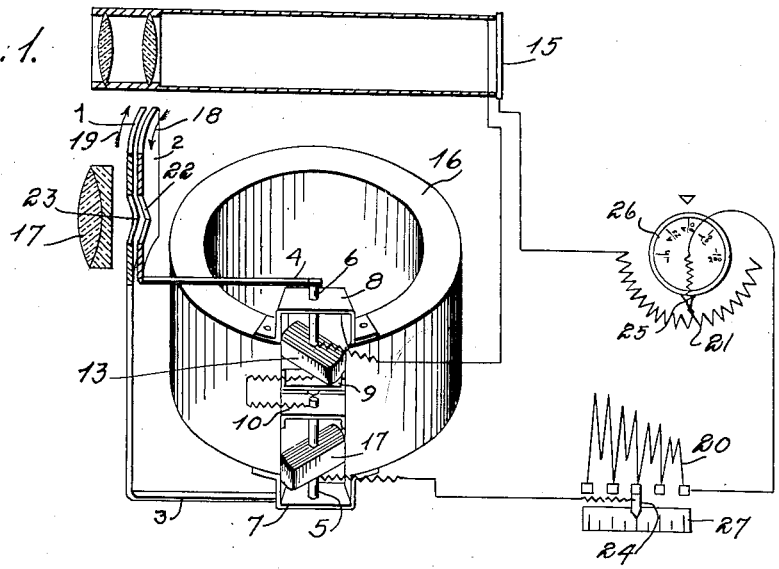

March 3, 1936.  Ö. RISZDORFER  2,032,633

DIAPHRAGM FOR PHOTOGRAPHIC CAMERAS

Filed Sept. 12, 1932

INVENTOR,
O. Riszdorfer,
BY
ATTORNEYS.

Patented Mar. 3, 1936

2,032,633

UNITED STATES PATENT OFFICE 2,032,633

DIAPHRAGM FOR PHOTOGRAPHIC CAMERAS

Ödön Riszdorfer, Budapest, Hungary

Application September 12, 1932, Serial No. 632,870
In Hungary September 12, 1931

5 Claims. (Cl. 95—64)

I have made a certain new and useful invention in improvements in and relating to diaphragms for photographic cameras, for which I have filed application in Hungary on Sept. 12, 1931, of which the following is a specification.

This invention relates to a diaphragm for photographic cameras consisting of at least two diaphragm elements which move in opposite directions and which are provided with cut out openings for the passage of the light. The object of the invention is to ensure that the opening in the diaphragm formed by the overlapping diaphragm elements is of symmetrical form in every position of the diaphragm elements. The symmetrical shape of the opening is of the greatest importance for the uniform exposure of the light-sensitive emulsion or of the elements of an exposure meter.

According to the invention, the diaphragm elements are arranged in such manner that they overlap each other and move around shafts arranged vertically to the beam of light falling through the opening in the diaphragm elements.

As an additional feature of the invention, the shafts carrying the diaphragm elements are coaxially arranged in such manner that the openings in the diaphragm elements are arranged in a position vertically to their own plane of rotation. The diaphragm elements consequently move along mutually coaxial cylindrical paths, with the result that all portions of both of the cut out openings will be displaced along concentric circles. The symmetrical form of the diaphragm opening is therefore ensured, provided that the openings in the diaphragm elements are of like shape.

A further advantage of the invention resides in the feature that the diaphragm elements are always and automatically adjusted (electrically, by means of d'Arsonval moving coils) to the existing intensity of light, whereby at the same time other features which are likewise important for uniform exposure, such as the shutter speed, the sensitiveness of the plate, etc. are also taken into consideration. In order to obtain the aforementioned results, the applicant arranges in the circuit of the moving coils a light-sensitive means which influences the value of the current, for instance a photo-electric cell, and regulating resistances operatable either automatically or by hand. Thus, the sliding contact of the resistance taking into consideration the shutter speed that has been set, is operated through positive connection of said contact with the setting mechanism of said shutter speed.

In describing the invention in detail, reference will be had to the accompanying drawing forming part of this application wherein like characters denote corresponding parts in the several views, and in which—

Figure 2:
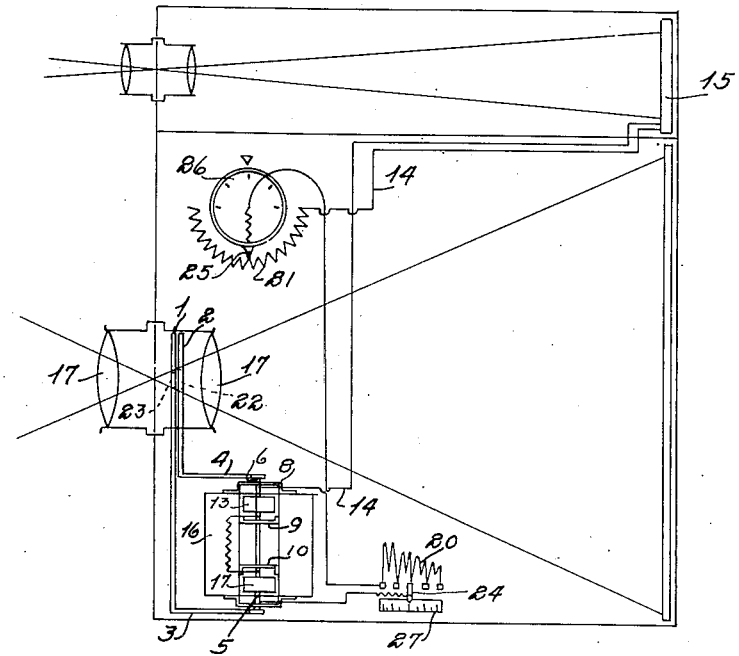

Figure 1 illustrates a perspective view, partly diagrammatic illustrating the working parts of the invention; and Figure 2 illustrates a vertical section taken through the optical axis of a camera constructed in accordance with this invention.

1 and 2 are the two diaphragm elements provided with the quadrangular openings 23 and 22 for the passage of the light. The diaphragm elements are cylindrically curved and coaxially arranged to move in parallel cylindrical paths. For this purpose the diaphragm element 1 is fixed, by means of the rectangular support 3, on the shaft 5, which shaft carries the moving coil 17 of a d'Arsonval moving-coil instrument. Shaft 5 is rotatably supported in bearings 7 and 10 in the magnetic field of a soft-iron magnet 16. The diaphragm element 2 is fixed, by means of support 4, on the shaft 6 of a similarly supported moving coil 13, which latter is rotatably supported in bearings 8 and 9. The coils 13 and 17 are so wound and arranged in series that they will rotate in opposite directions when energized. The diaphragm elements 1 and 2 will therefore be moved in the directions of arrows 18 and 19 respectively. The openings 22 and 23, here shown as rectangular, are arranged in the diaphragm elements in such fashion that one of the diagonals of the rectangle which they form extends in a direction parallel to the direction of motion, while the other diagonal extends in a direction vertical to the direction of motion. The openings, moreover, are so arranged that in the position illustrated in the drawing the two rectangles will cover each other. The result is that when the diaphragm elements are displaced in opposite directions, the openings thereby produced will be different in size but will nevertheless be symmetrical and similar in form.

The current needed for the actuation of the device may be supplied by a battery or by any other suitable source of current, so connected with the coils that the intensity of the current will be influenced by a light-sensitive element or photo-cell 15 in proportion to the existing intensity of light. No special battery is needed if a photo-cell 15 is used, which under the influence of the light produces a sufficiently strong current. Photo-cells like this are known in the art.

The invention may be further improved and the device may be so arranged that the current is not only influenced by the existing intensity of light, but in addition to that also by other values. As shown in the drawing, there have been arranged in the circuit of the photo-cell 15 two resistances 21 and 20. The regulating resistance 21 is provided with a sliding contact 25, which latter is positively connected with the setting mechanism of the shutter speed of the photographic apparatus, with the result that when the shutter speed is set, the resistance placed in the circuit will correspond in value to that of the shutter speed. The second resistance 20 is provided with a sliding contact 24 moving before a scale 27. The scale has been graduated according to the light-sensitiveness of the negative material used, with the result that the current can be influenced also in dependence upon this feature.

The diaphragm operates in the following manner:

The light falling on the photo-electric cell 15 produces a current the intensity of which is proportionate to the quantity of light and which flows through the conductor 14 and through the coils 12 and 13. The intensity of the cell current can also be influenced by means of the variable resistance 20 and 21 inserted into the cell circuit which resistances can be varied in proportion to the factors influencing correct exposure, as for instance the degree of sensitivity of the emulsion employed, the shutter speed, etc. The coils arranged between the poles of the magnet 16 are in consequence of the electro-magnetic effect deflected from their position of rest in proportion to the intensity of the current and are thereby, with the aid of the levers 3 and 4, proportionately displacing the diaphragm elements 1 and 2. The coils being wound in opposite senses, they will owing to the electro-magnetic effect be deflected in opposite direction and thus the diaphragm elements also will become displaced in the directions of the arrows 18 and 19 along mutually concentric cylinder surfaces parallel to the shafts 5 and 6. The ports 22 and 23 cut out in the diaphragm, displaced along cylindrical surfaces will always give diaphragm openings of regular and mutually similar shapes.

What I claim is:

1. A diaphragm for photographic cameras including a pair of apertured diaphragm elements overlapping each other, alined vertical shafts supporting said elements whereby the elements may rotate on a common axis, a permanent magnet, a pair of field coils arranged between the poles of said magnet to swing in opposite directions through equal arcs when energized, each of said coils being fixed on a respective shaft, a light sensitive cell, and a circuit connecting said cell and coils in series.

2. A diaphragm for photographic cameras including a pair of apertured diaphragm elements overlapping each other, alined vertical shafts supporting said elements whereby the elements may rotate on a commmon axis, a permanent magnet, a pair of field coils arranged between the poles of said magnet to swing in opposite directions through equal arcs when energized, each of said coils being fixed on a respective shaft, a light sensitive cell, a circuit connecting said cell and coils in series, and a variable resistance in said circuit adapted to be set in accordance with the sensitiveness of the film emulsion to be used in the camera.

3. A diaphragm for photographic cameras including a pair of apertured diaphragm elements overlapping each other, alined vertical shafts supporting said elements whereby the elements may rotate on a common axis, a permanent magnet, a pair of field coils arranged between the poles of said magnet to swing in opposite directions through equal arcs when energized, each of said coils being fixed on a respective shaft, a light sensitive cell, a circuit connecting said cell and coils in series, a variable resistance in said circuit adapted to be set in accordance with the sensitiveness of the film emulsion to be used in the camera, and a second variable resistance in said circuit adapted to be set in accordance with the selected shutter speed of the camera.

4. In a photographic camera having a lens, a pair of apertured diaphragm elements overlapping each other, alined shafts supporting said elements whereby the elements may rotate on a common axis, said axis being at right angles to the optical axis of the lens, a permanent magnet, a pair of field coils arranged between the poles of said magnet to swing in opposite directions through equal arcs when energized, each of said coils being fixed on a respective shaft, a light sensitive cell, and a circuit connecting said cell and coils in series.

5. In a photographic camera having a lens, a pair of apertured diaphragm elements overlapping each other, alined shafts supporting said elements whereby the elements may rotate on a common axis, said axis being at right angles to the optical axis of the lens, a permanent magnet, the apertures of the diaphragm elements being arranged in a member extending vertically to the plane of oscillation of said diaphragm elements, a pair of field coils arranged between the poles of said magnet to swing in opposite directions through equal arcs when energized, each of said coils being fixed on a respective shaft, a light sensitive cell, and a circuit connecting said cell and coils in series.

ÖDÖN RISZDORFER.